(12) United States Patent
Song

(10) Patent No.: US 8,339,782 B2
(45) Date of Patent: Dec. 25, 2012

(54) HANDHELD ELECTRONIC DEVICE AND KEYPAD HAVING KEYS WITH UPSTANDING ENGAGEMENT SURFACES

(75) Inventor: Jae Ryee Song, Kanata (CA)

(73) Assignee: Research In Motion Limited, Waterloo, Ontario (CA)

(*) Notice: Subject to any disclaimer, the term of this patent is extended or adjusted under 35 U.S.C. 154(b) by 634 days.

(21) Appl. No.: 12/562,350

(22) Filed: Sep. 18, 2009

(65) Prior Publication Data
US 2011/0069439 A1     Mar. 24, 2011

(51) Int. Cl.
*H05K 5/00* (2006.01)
*H05K 7/00* (2006.01)

(52) U.S. Cl. ......... 361/679.56; 361/679.01; 361/679.08; 361/679.3

(58) Field of Classification Search ............. 361/679.01, 361/679.08, 679.3, 679.56
See application file for complete search history.

(56) References Cited

U.S. PATENT DOCUMENTS

| | | | |
|---|---|---|---|
| 5,515,763 A | 5/1996 | Vandervoort | |
| 5,767,463 A | 6/1998 | Gandre | |
| 6,543,947 B2 | 4/2003 | Lee | |
| 7,572,990 B2* | 8/2009 | Struve, Jr. | 200/5 A |
| 8,000,741 B2* | 8/2011 | Griffin et al. | 455/556.2 |
| 2007/0287391 A1 | 12/2007 | Hofer et al. | |
| 2008/0237021 A1* | 10/2008 | Struve | 200/520 |

FOREIGN PATENT DOCUMENTS

| EP | 1729315 A1 | 12/2006 |
|---|---|---|
| EP | 1918955 A1 | 5/2008 |

OTHER PUBLICATIONS

European Patent Application No. 09170742.2 Search Report dated Feb. 1, 2010.

* cited by examiner

*Primary Examiner* — Anthony Haughton
(74) *Attorney, Agent, or Firm* — Mukundan Chakrapani; Borden Ladner Gervais LLP

(57) ABSTRACT

An improved handheld electronic device and keypad include keys having upstanding engagement surfaces that provide a greater effective space between keys than the nominal key-to-key distance therebetween. More particularly, an upstanding engagement surface of one key is spaced farther from that of an adjacent key than the nominal key-to-key distance therebetween. The added space facilitates input by reducing miskeying errors, which allows for faster input with reduced visual and mental attention being required during such input.

18 Claims, 5 Drawing Sheets

HANDHELD ELECTRONIC DEVICE AND KEYPAD HAVING KEYS WITH UPSTANDING ENGAGEMENT SURFACES

BACKGROUND

1. Field

The disclosed and claimed concept relates generally to handheld electronic devices and, more particularly, to a handheld electronic device and a keypad having keys that include an upstanding engagement surface.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also a feature wireless communication capability, although many such handheld electronic devices are stand-alone devices that are functional without communication with other devices.

With the progress of technology, handheld electronic devices have grown increasingly sophisticated in terms of functions, features, and the like, while at the same time have become progressively smaller in size. As new handheld electronic devices become smaller and smaller, such devices can become more and more difficult to use for a number of reasons, including the small size and the close spacing of keys and other elements on a handheld electronic device. While attempts have been made to overcome the shortcomings associated with relatively smaller handheld electronic devices, such attempts have not been without limitation. It thus would be desirable to provide an improved handheld electronic device and an improved keypad that provide enhanced usability.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
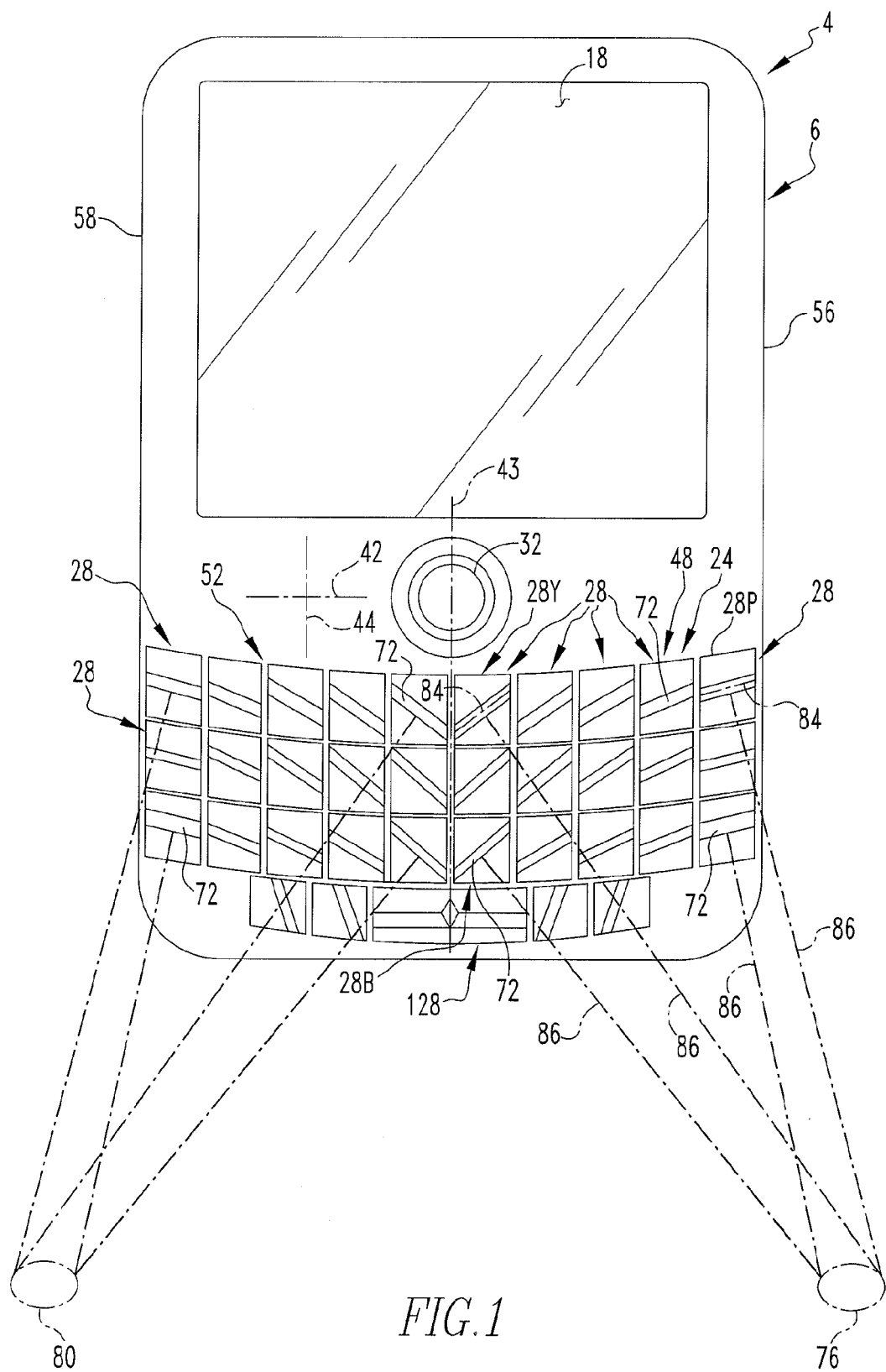
FIG. 1 is a front elevational view of an improved handheld electronic device in accordance with the disclosed and claimed concept.
Figure 2:
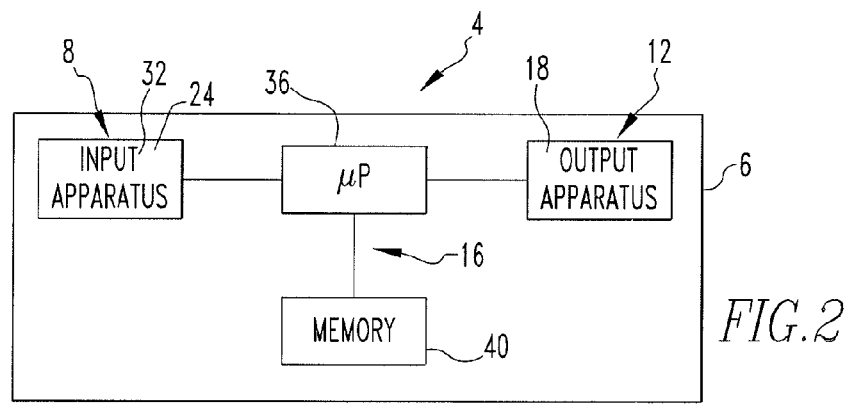
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, vibration motors, and so forth can be additionally or alternatively used.

As can be understood from FIG. 1, the input apparatus 8 includes a keypad 24 and a multiple-axis input device which, in the exemplary embodiment depicted herein, is a track ball 32 that will be described in greater detail below. The keypad 24 comprises a plurality of keys 28 that can have characters (not expressly depicted herein for purposes of clarity) assigned thereto in the exemplary form of a QWERTY keyboard. Other character layouts such as AZERTY and QWERTZ, by way of example, may be employed without departing from the present concept. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable about multiple axes that extend through the center of the track ball 32 and, in the present exemplary embodiment, is freely rotatable in all directions with respect to the housing 6. A rotation of the track ball 32 a predetermined rotational distance with respect to the housing 6 provides an input to the processor apparatus 16, and such inputs can be employed by a number of routines, for example, as navigational inputs, scrolling inputs, selection inputs, and other inputs. As employed herein, the expression "a number of" and variations thereof shall refer broadly to any non-zero quantity, including a quantity of one.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines, for example, as selection inputs, delimiter inputs, or other inputs.

As can be seen in FIG. 2, the processor apparatus 16 comprises a processor 36 and a memory 40. The processor 36 may be, for instance and without limitation, a microprocessor (μP) that is responsive to inputs from the input apparatus 8 and that provides output signals to the output apparatus 12. The processor 36 interfaces with the memory 40.

The memory 40 can be said to constitute a machine-readable storage medium and can comprise any one or more of a variety of types of internal and/or external storage media such as, without limitation, RAM, ROM, EPROM(s), EEPROM(s), FLASH, and the like that provide a storage register for data storage such as in the fashion of an internal or external storage area of a computer, and can be volatile memory or nonvolatile memory. The memory 40 has stored therein a number of routines which are executable on the processor 36 to cause the handheld electronic device 4 to perform certain operations. The routines can be in any of a variety of forms such as, without limitation, software, firmware, and the like.

As can be understood from FIG. 1, the keys 28 are arranged in a plurality of rows that extend generally along a first direction 42 and a plurality of columns that extend along a second direction 44. From the perspective of FIG. 1, the exemplary first direction is the horizontal direction and the exemplary second direction is the vertical direction. The handheld electronic device 4 can be said to have a main axis 43 that extends through the track ball 32 and that, from the perspective of FIG. 1, extends in the second direction 44. The keys 28 can generally be said to be arranged in a first array 48 disposed on a right-hand portion 56 of the housing 6 and a second array 52 disposed on a left-hand portion 58 of the housing 6. The first array 48 and right-hand portion 56 of the housing 6 are disposed at one side of the main axis 43, and the second array 52 and the left-hand portion 58 of the housing 6 are disposed at another side of the main axis 43. The keypad 24 also includes a <SPACE> key 128 that can be said to span the first and second arrays 48 and 52 or that alternatively can be said to not be included exclusively within either the first array 48 or the second array 52.

Figure 3:
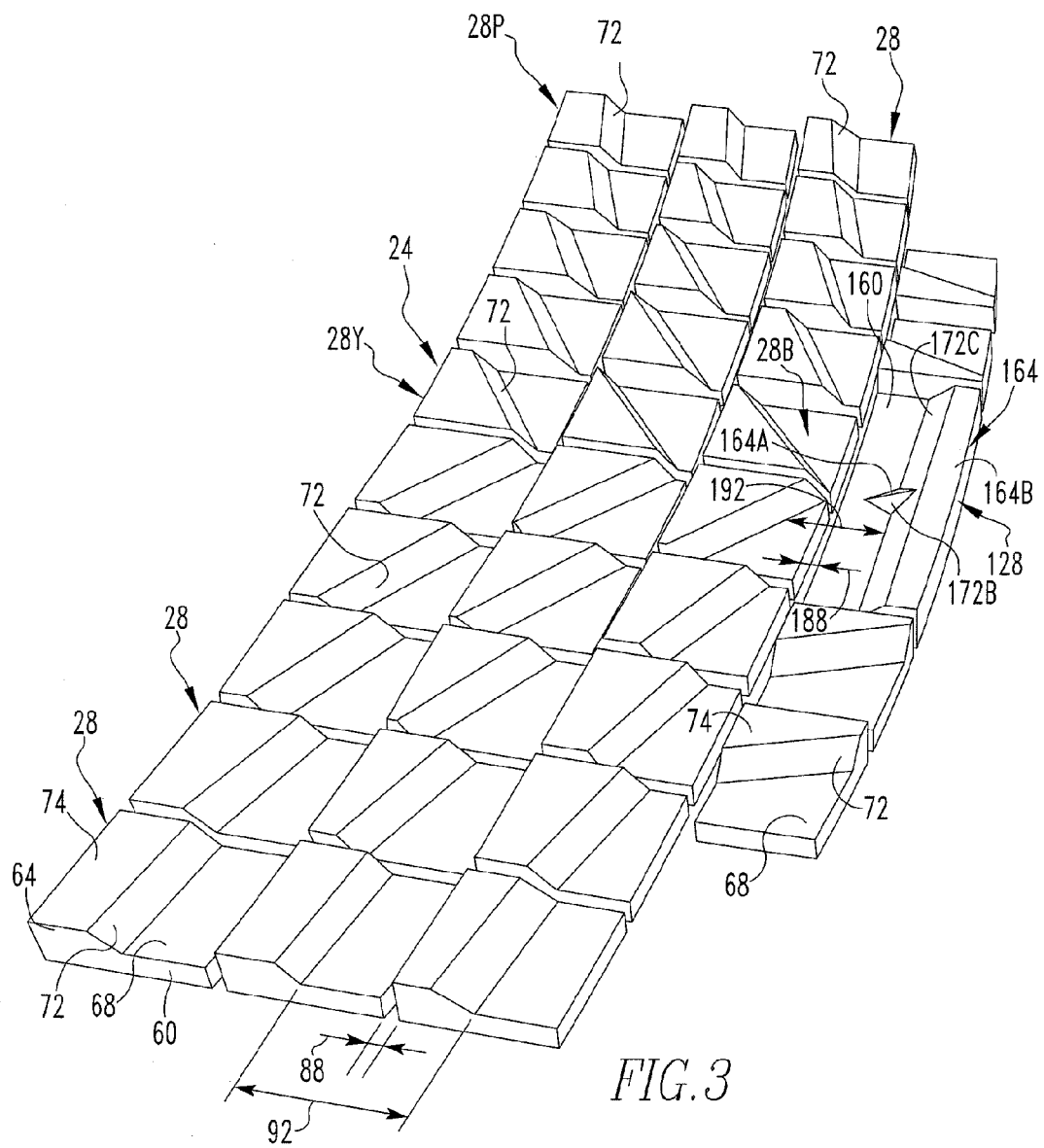
FIG. 3 is a perspective view of a keypad of the handheld electronic device of FIG. 1.
Figure 4:
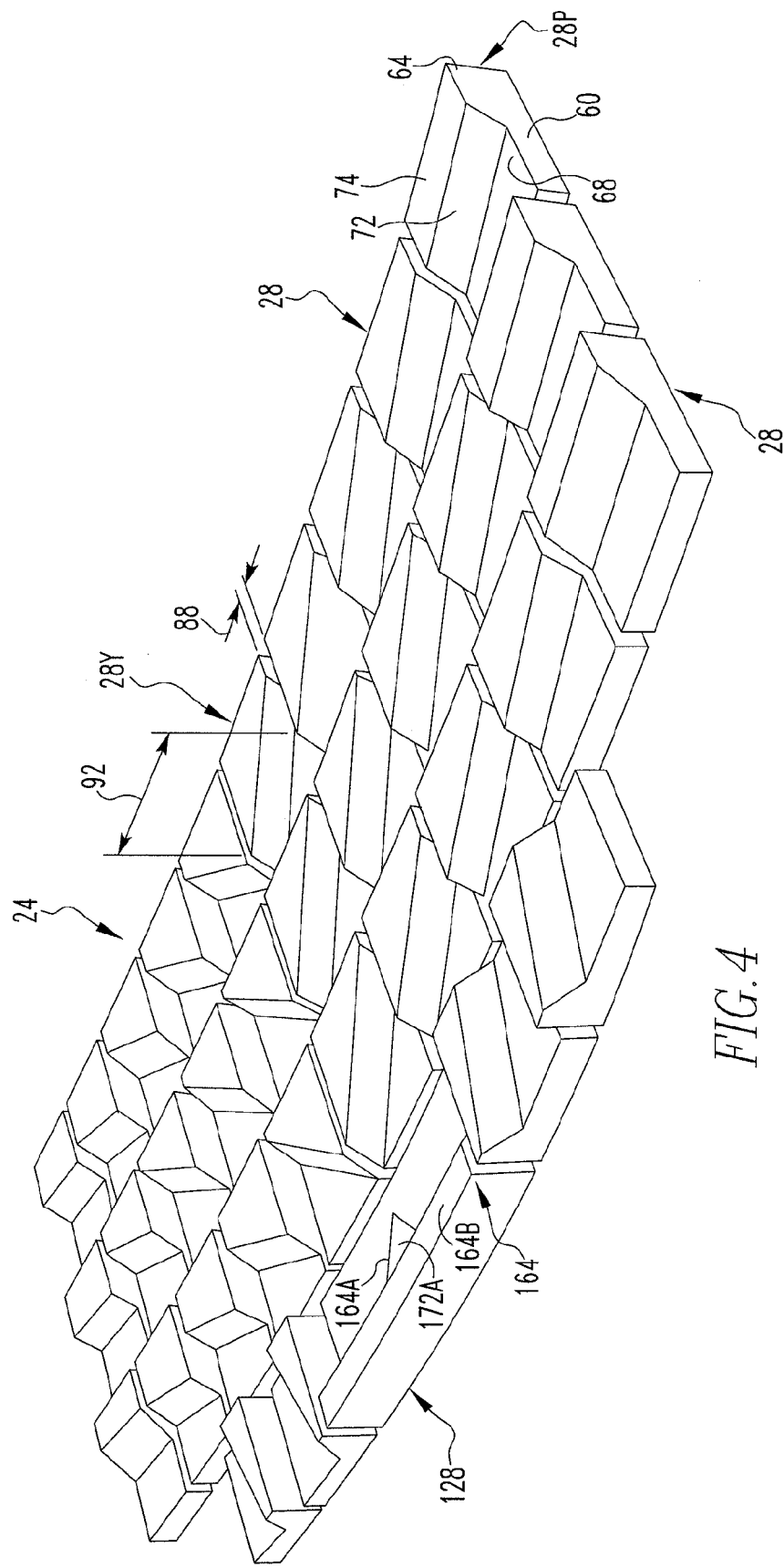
FIG. 4 is another perspective view of the keypad.

The keypad 24 is depicted in FIGS. 3 and 4 as being removed from the housing 6 of the handheld electronic device 4 for purposes of illustration. The keys 28 generally each include a base portion 60 and an engagement portion 64 disposed thereon. The engagement portion 64 is upstanding from the base portion 60 to provide a stepped configuration to each such key 28. Each base portion 60 includes a base surface 68 that is depicted in the accompanying figures as being of a generally planar configuration. Each engagement portion 64 includes an upstanding engagement surface 72 and an upper surface 74, with the engagement surface 72 generally extending between the base surface 68 and the upper surface 74. In the exemplary embodiment depicted herein, each upper surface 74 is depicted as being generally planar and parallel with the base surface 68 of the same key 28. The base surfaces 68 are depicted herein as being generally coplanar with one another, and the upper surfaces 74 are likewise depicted herein as being generally coplanar, but it is understood that the base surfaces 68 or the upper surfaces 74 or both can have configurations other than those expressly depicted herein without departing from the present concept.

As can be understood from FIGS. 1 and 3, for example, the engagement surfaces 72 are non-coplanar and non-parallel with one another and each face in an outward direction toward either a first fixed reference 76 or a second fixed reference 80, both of which are disposed outboard of the housing 6. Most if not all of the engagement surfaces 72 are each oriented oblique to the first and second directions 42 and 44, and the particular orientation of each engagement surface 72 varies according to the location of the engagement surface 72 or its key 28 or both within the first array 48 or the second array 52. For instance, the keys 28 can be said to include a key 28P, a key 28B, and a key 28Y, all of which are situated in the first array 48. The engagement surfaces 72 of the keys 28P, 28B, and 28Y are situated in different orientations because they are disposed at different locations within the first array 48. However, the engagement surfaces 72 of these keys 28P, 28B, and 28Y both face generally toward the first fixed reference 76.

More particularly, the base surface 68 and the engagement surface 72 of any given key 28 can be said to intersect with one another along an intersection axis 84 of the key 28. The intersection axis 84 of any such key 28 is disposed substantially perpendicular to an engagement axis 86 that extends between the intersection axis 84 and whichever of the fixed references toward which the engagement surface 72 generally faces, i.e., the first fixed reference 76 for the keys 28 within the first array 48 and the second fixed reference 80 for the keys 28 within the second array 52. While the engagement surfaces 72 are depicted herein as each being generally planar and intersecting the corresponding base surface 68 along a sharply defined and depicted line, it is understood that such a depiction is intended merely for purposes of illustration and is not intended to be limiting. For instance, the base surface 68 and the upstanding engagement surface 72 of any given key 28 might have a filleted, i.e., curved intersection, and the line of intersection may additionally or alternatively be arcuate rather than straight. Moreover, the engagement surfaces 72 may themselves each be non-planar, such as by being concave, convex, and the like without limitation. While in the accompanying figures the intersection axis 84 is clearly depicted as being linear and well defined, it is understood that the depiction of the intersection axis 84 and the engagement axis 86 is intended to represent the fashion in which each engagement surface 72 faces generally toward either the first fixed reference 76 or the second fixed reference 80.

As can be understood from FIGS. 3 and 4, the configuration of the keys 28 to include the upstanding engagement surface 72 advantageously facilitates input by providing an additional surface, i.e., the engagement surface 72, that can be contacted when actuating the key 28 and that is spaced a greater distance from an adjacent key than the nominal key-to-key spacing between adjacent keys 28. For instance, the distance between adjacent keys 28 is indicated in an exemplary fashion in each of FIG. 3 and FIG. 4 at the numeral 88. A distance between an engagement surface 72 of a key 28 and that of an adjacent key 28 can be said to constitute a pitch space that is indicated generally in each of FIG. 3 and FIG. 4 at the numeral 92. The pitch space 92 is significantly larger than the distance 88 between adjacent keys 28, and typically is several times larger. As such, when actuating keys 28 via engagement of their engagement surfaces 72, a far lesser likelihood exists of mistakenly engaging an adjacent key 28 rather than an intended key 28. This facilitates input by enabling the user to actuate keys 28 with greater speed and accuracy and with relatively lesser visual and mental attention than would be required when operating another keypad that did not include the upstanding engagement surfaces 72 described herein.

As can be further understood from FIGS. 1, 3, and 4, the <SPACE> key 128 includes a base portion 160 and an engagement portion 164, with the engagement portion 164 comprising a first engagement portion 164A and a second engagement portion 164B which in the depicted embodiment are connected together. The first engagement portion 164A includes a pair of engagement surfaces, i.e., a first engagement surface 172A and a second engagement surface 172B, both of which are upstanding from the base portion 160 and which face generally away from one another. That is, the first engagement surface 172A faces generally toward the first fixed reference 76, and the second engagement surface 172B faces generally toward the second fixed reference 80. The second engagement portion 164B advantageously includes an additional engagement surface 172C that is upstanding from the base portion 160 and that faces generally toward the keys 28 that are disposed in rows above the <SPACE> key 128, i.e., the three rows of keys 28 that are depicted in FIG. 1 as being vertically higher than the <SPACE> key 128.

The additional engagement surface 172C advantageously facilitates input by facing generally toward such other keys 28 disposed in the aforementioned relatively higher rows. That is, the <SPACE> key 128 is typically actuated during text entry with a far greater frequency than any other key 28, and a user entering text will frequently move between an actuation of one of the keys 28 disposed above the <SPACE> key 128 and an actuation of the <SPACE> key itself 128. Such movements often include a substantial vertical component from the perspective of FIG. 1, and the additional engagement surface 172C advantageously serves as another engagement surface that is spaced farther, as at the numeral 192 in FIG. 3, in a vertical direction (again from the perspective of FIG. 1) from the engagement surfaces 72 of the keys 28 adjacent to the <SPACE> key 128 than the key-to-key spacing, as at the numeral 188 in FIG. 3, between the <SPACE> key 128 and such adjacent keys 28. Again, the additional engagement surface 172C advantageously facilitates input by minimizing erroneous key actuations and by requiring less visual and mental attention to provide such input, in a fashion similar to the engagement surfaces 72 of the other keys 28. The orientation of the additional engagement surface 172C to face generally toward the other keys 28 further facilitates input by enabling an economy of physical movement between the <SPACE> key 128 and adjacent keys 28, such as during text entry.

Figure 6:
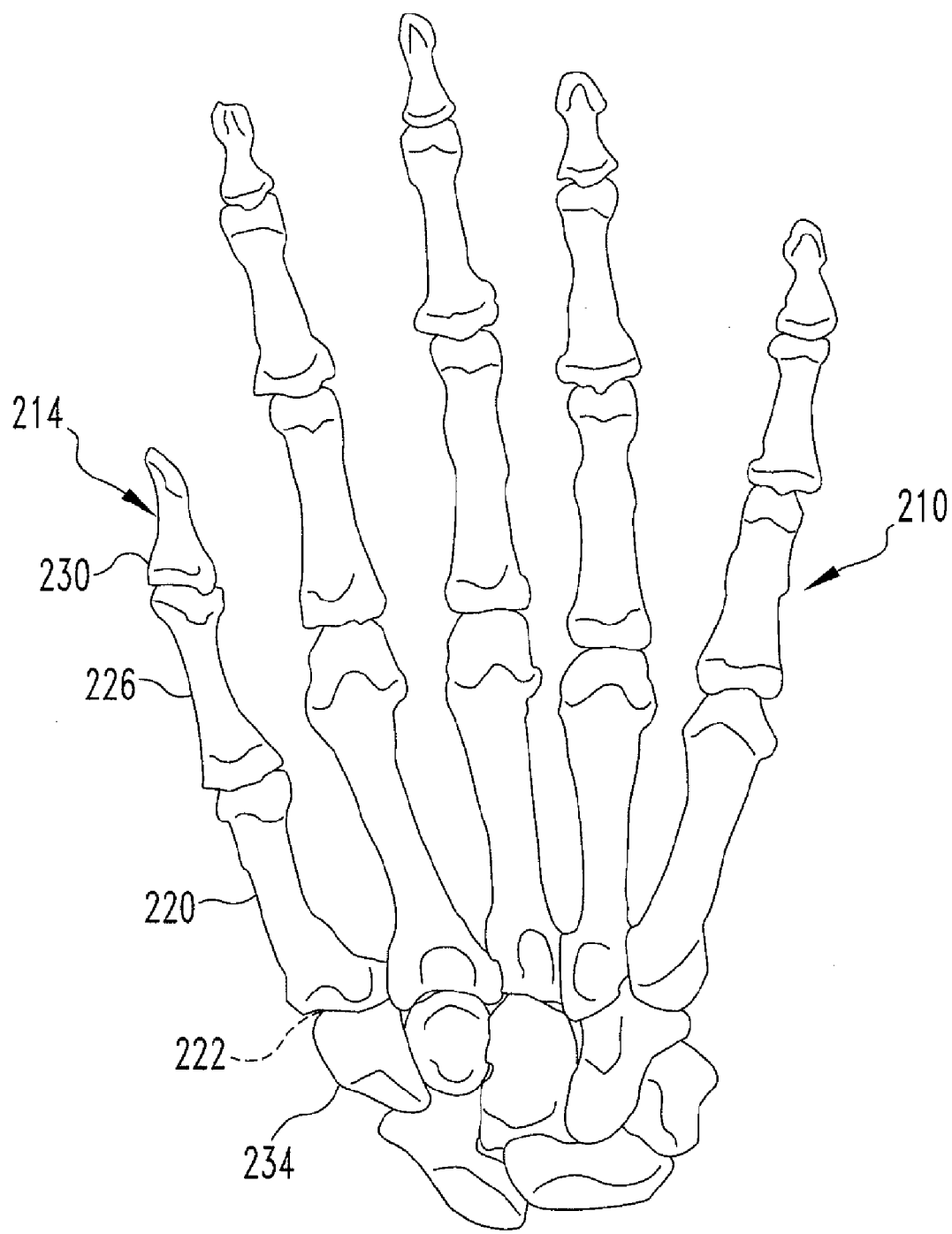
FIG. 6 is a schematic cutaway view of a typical hand of the user.

The exemplary first and second fixed references 76 and 80 that are depicted in FIG. 1 can be said to coincide generally with a joint of a user's hand 210 which, in the example depicted generally in FIG. 6, is the joint at the base of the thumb 214, i.e., a joint 222 at which the metacarpal 220 of the thumb articulates with a carpal bone 234 of the same hand 210, although another joint of the thumb 214 can likewise be employed. As is generally understood, the articulation motion of any such joint includes both a rotation component and a sliding component meaning that, for example, the metacarpal 220 and carpal 234 do not articulate about a point, but rather the motion includes both a rotation and translation of one with respect to the other during articulation. As such, the first and second fixed references 76 and 80 are depicted in FIG. 1 as not being points, but rather being small areas. The first and second fixed references 76 and 80 are depicted in FIG. 1 as corresponding with a position at or above the aforementioned joint 222 between the metacarpal 220 and the carpal 234 of the right and left hands 210, respectively, it being understood that the right and left hands are mirror images of one another and that only the right hand is expressly depicted herein for purposes of simplicity. That is, from the perspective of FIG. 1, the first and second fixed references 76 and 80 are situated at a location spaced outward from the plane of the page of FIG. 1, and are generally also spaced outward in the same direction from a plane that comprises the base surfaces 68 of the keys 28. Such spacing can represent the actual position of the aforementioned joint between the metacarpal 220 and the carpal 234, or the first and second fixed references 76 and 80 can be disposed still further above such a joint 222.

Figure 5A:
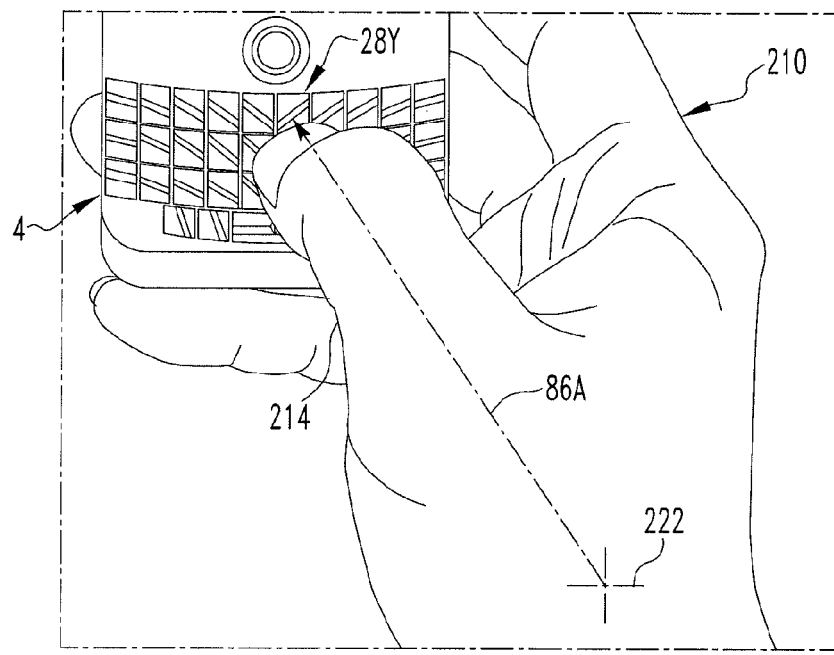
FIGS. 5A and 5B depict actuation of the keypad by a user.
Figure 5B:
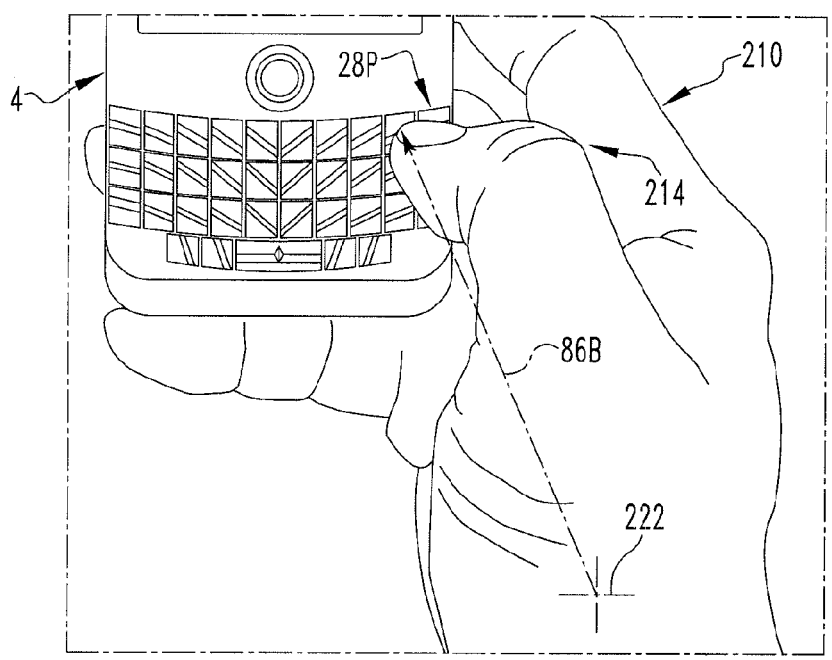

FIGS. 5A and 5B illustrate the way in which the thumb 214 of the hand 210 can move with respect to the hand 210, such as when the non-thumb portions of the hand 210 are kept generally stationary. The actuation movement of the thumb 214 as to any given key 28 typically is in a direction directly toward the key 28 from the aforementioned joint 222 between the metacarpal 220 and the carpal 234, or a location spaced above such a joint 222, i.e., out of the plane of the page of FIG. 1.

As can be understood from FIG. 5A, the direction of actuation, which is indicated generally at the numeral 86A, is in a generally diagonal direction between the first fixed reference 76 and the key 28Y being actuated, i.e., diagonal with respect to the first and second directions 42 and 44. In FIG. 5B, however, the movement of the thumb 214 in actuating the particular key 28P that is being actuated is in another direction of actuation, which is indicated generally at the numeral 86B, and which is generally more vertical (from the perspective of FIGS. 1 and 5B) from the first fixed reference 76 than the direction of action 86A. Hence, the engagement surfaces 72 of the keys 28 are disposed at different orientations depending upon their positions in the keypad 24, meaning dependent upon their positions with respect to the first fixed reference 76 or the second fixed reference 80.

It is reiterated that the upstanding engagement surfaces 72 advantageously facilitate input by serving as surfaces that can be engaged by the user in actuating the keys 28. The orientation of the engagement surfaces 72 to be non-coplanar and non-parallel with one another and to face in a direction generally toward the first or second fixed references 76 or 80 in a fashion that varies according to the location of the engagement surface 72 on the keypad 24 causes the engagement surfaces 72 to each be oriented generally toward the aforementioned joint 222 between the metacarpal 220 and the carpal 234. This enables a user to easily actuate any given key 28 by applying an actuation force with the thumb 214 along a direction of actuation that extends from the joint 222 in a direction generally perpendicular to the engagement surface 72. Thus, the physical effort that is required of a user to actuate the keys 28 in the aforementioned fashion is less than would be required if the keys were otherwise arranged since in the current arrangement the actuation force is applied along the direction of actuation which is generally perpendicular to the orientation of the engagement surface 72. This, in turn, facilitates input by enabling the user to actuate the keys 28 with greater speed and accuracy and with relatively less visual and mental attention and less physical effort than would be required if operating another keypad that did not include the upstanding engagement surfaces 72 described herein.

FIG. 6 generally depicts the skeletal aspects of the exemplary right hand 210 of the user and, more particularly, the thumb 214. The thumb 214 comprises the metacarpal 220, a first phalanx 226, and a second phalanx 230. The metacarpal 220 articulates at the joint 222 that it makes with the carpal bone 234 of the hand 210. The first phalanx 226 forms another joint with the metacarpal 220, and the second phalanx 230 forms still another joint with the first phalanx 226. The joint 222 between the metacarpal 220 and the carpal 234 typically is difficult to perceive visually and generally cannot be seen in FIGS. 5A and 5B apart from the approximated indication shown at the numeral 222 therein. The joint between the metacarpal 220 and the first phalanx 226 is generally visible, and the joint between the first and second phalanges 226 and 230 likewise is generally visible. However, such joints do not necessarily represent the first and second fixed references 76 and 80, and rather it is reiterated that the exemplary first and second fixed references 76 and 80 coincide with the joint between the thumb metacarpals 220 and the carpals 234 with which they articulate.

The improved handheld electronic device 4 and keypad 24 thus facilitate input by providing the upstanding engagement surfaces 72, 172A, 172B, and 172C which are spaced farther apart from one another and from adjacent keys 28 than the nominal key-to-key distance. Such greater spacing reduces the likelihood of miskeying errors, which allows for faster input and reduced visual and mental attention required during such input.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A handheld electronic device that is structured to be operated by the thumbs of a user, the handheld electronic device comprising:
a housing having a left-hand portion and a right-hand portion;
a keypad disposed on the housing;
the keypad comprising a plurality of keys situated in a plurality of rows that extend along a first direction and a plurality of columns that extend along a second direction;
the keys being arranged in a first array and a second array, the first array being disposed on the right-hand portion of the housing, the second array being disposed on the left-hand portion of the housing;
the keys being of a stepped shape and comprising a base portion and an upstanding engagement portion disposed on the base portion, the base portions each having a base surface, the engagement portions each having an upstanding engagement surface;
the engagement surfaces of at least some of the keys each being oriented non-coplanar and non-parallel with one another;
the engagement surfaces of at least some of the keys of the first array are each oriented non-coplanar and non-parallel with one another, oblique to the first and second directions, and facing in a direction outboard of the right-hand portion of the housing in a fashion that varies according to the location of the engagement surface within the first array; and
the engagement surfaces of at least some of the keys of the second array are each oriented non-coplanar and non-parallel with one another, oblique to the first and second directions, and facing in a direction outboard of the left-hand portion of the housing in a fashion that varies according to the location of the engagement surface within the second array.

2. The handheld electronic device of claim 1 wherein at least some of the engagement surfaces of the first array each face generally toward a first fixed reference disposed at a location outboard of the right-hand portion of the housing, and wherein at least some of the engagement surfaces of the second array each face generally toward a second fixed reference disposed at a location outboard of the left-hand portion of the housing.

3. The handheld electronic device of claim 1 wherein the base surface and the engagement surface of each of at least some of the keys of the first array meet along an intersection axis of the key that is oriented generally perpendicular to an engagement axis of the key that extends between the intersection axis and the first fixed reference, the orientation of the engagement axis of the key varying according to the location of the key within the first array.

4. The handheld electronic device of claim 1 wherein the first fixed reference coincides with a position at or above a joint of a right hand of a user of the keypad at which a right thumb metacarpal articulates with a carpal.

5. The handheld electronic device of claim 1 wherein the engagement surface of each of at least some of the keys is oriented oblique to the base surface of the key.

6. The handheld electronic device of claim 5 wherein at least some of the base surfaces are oriented generally coplanar.

7. The handheld electronic device of claim 1 wherein at least some of the engagement surfaces of the first array each face generally away from the second array, and wherein at least some of the engagement surfaces of the second array each face generally away from the first array.

8. The handheld electronic device of claim 1 wherein, for each of at least some of the keys, at least a portion of the engagement surface of a given key is spaced farther from the engagement surface of at least a first adjacent key than the distance between the base portion of the given key and the at least first adjacent key.

9. The handheld electronic device of claim 1 wherein one of the keys of the keypad is a <SPACE> key having as its upstanding engagement portion a first engagement portion and a second engagement portion, the first engagement portion having a pair of upstanding engagement surfaces, one of the pair facing in a direction outboard of the right-hand portion of the housing, the other of the pair facing in a direction outboard of the left-hand portion of the housing, the second engagement portion having another upstanding engagement surface that faces in a direction toward at least some of the keys that are disposed in rows situated higher than the <SPACE> key.

10. A keypad structured for use with a handheld electronic device and being further structured to be operated by the thumbs of a user, the keypad comprising:
a plurality of keys situated in a plurality of rows that extend along a first direction and a plurality of columns that extend along a second direction;
the keys being arranged in a first array and a second array;
the keys being of a stepped shape and comprising a base portion and an upstanding engagement portion disposed on the base portion, the base portions each having a base surface, the engagement portions each having an upstanding engagement surface;
the engagement surfaces of at least some of the keys each being oriented non-coplanar and non-parallel with one another; the engagement surfaces of at least some of the keys of the first array are each oriented non-coplanar and non-parallel with one another, oblique to the first and second directions, and facing in a direction outboard of the right-hand portion of the housing in a fashion that varies according to the location of the engagement surface within the first array; and
the engagement surfaces of at least some of the keys of the second array are each oriented non-coplanar and non-parallel with one another, oblique to the first and second directions, and facing in a direction outboard of the left-hand portion of the housing in a fashion that varies according to the location of the engagement surface within the second array.

11. The handheld electronic device of claim 10 wherein at least some of the engagement surfaces of the first array each face generally toward a first fixed reference disposed at a location outboard of the right-hand portion of the housing, and wherein at least some of the engagement surfaces of the second array each face generally toward a second fixed reference disposed at a location outboard of the left-hand portion of the housing.

12. The handheld electronic device of claim 10 wherein the base surface and the engagement surface of each of at least some of the keys of the first array meet along an intersection axis of the key that is oriented generally perpendicular to an engagement axis of the key that extends between the intersection axis and the first fixed reference, the orientation of the engagement axis of the key varying according to the location of the key within the first array.

13. The handheld electronic device of claim 10 wherein the first fixed reference coincides with a position at or above a joint of a right hand of a user of the keypad at which a right thumb metacarpal articulates with a carpal.

14. The keypad of claim 10 wherein the engagement surface of each of at least some of the keys is oriented oblique to the base surface of the key.

15. The keypad of claim 14 wherein at least some of the base surfaces are oriented generally coplanar.

16. The keypad of claim 10 wherein at least some of the engagement surfaces of the first array each face generally away from the second array, and wherein at least some of the engagement surfaces of the second array each face generally away from the first array.

17. The keypad of claim 10 wherein, for each of at least some of the keys, at least a portion of the engagement surface of a given key is spaced farther from the engagement surface of at least a first adjacent key than the distance between the base portion of the given key and the at least first adjacent key.

18. The keypad of claim 10 wherein one of the keys is a <SPACE> key having as its upstanding engagement portion a first engagement portion and a second engagement portion, the first engagement portion having a pair of upstanding engagement surfaces, one of the pair facing in a direction outboard of the first array, the other of the pair facing in a direction outboard of the second array, the second engagement portion having another upstanding engagement surface that faces in a direction toward at least some of the keys that are disposed in rows situated higher than the <SPACE> key.

* * * * *